United States Patent
Roffman

(10) Patent No.: US 7,025,455 B2
(45) Date of Patent: Apr. 11, 2006

(54) MULTIFOCAL CONTACT LENSES HAVING A PINHOLE

(75) Inventor: Jeffrey H. Roffman, Jacksonville, FL (US)

(73) Assignee: J&J Vision Care, Inc.

( * ) Notice: Subject to any disclaimer, the term of this patent is extended or adjusted under 35 U.S.C. 154(b) by 0 days.

(21) Appl. No.: 10/742,123

(22) Filed: Dec. 19, 2003

(65) Prior Publication Data

US 2005/0134793 A1  Jun. 23, 2005

(51) Int. Cl.
*G02C 7/04* (2006.01)
*G02C 7/06* (2006.01)
*G02C 7/02* (2006.01)

(52) U.S. Cl. ............... 351/160 R; 351/169; 351/177
(58) Field of Classification Search ............ 351/161, 351/160 R, 160 H, 162, 177, 169
See application file for complete search history.

(56) References Cited

U.S. PATENT DOCUMENTS

| | | | |
|---|---|---|---|
| 3,794,414 A | 2/1974 | Wesley | 351/161 |
| 4,744,647 A | 5/1988 | Meshel et al. | 351/177 |
| 4,955,904 A | 9/1990 | Atebara et al. | 623/6.17 |
| 4,976,732 A | 12/1990 | Vorosmarthy | 623/6.17 |
| 5,245,367 A | 9/1993 | Miller et al. | 351/161 |
| 5,260,727 A | 11/1993 | Oksman et al. | 351/162 |
| 5,434,630 A | 7/1995 | Bransome | 351/162 |
| 5,608,471 A | 3/1997 | Miller et al. | 351/161 |
| 5,662,706 A | 9/1997 | Legerton et al. | 623/5.13 |
| 5,757,458 A | 5/1998 | Miller et al. | 351/162 |
| 5,786,883 A | 7/1998 | Miller et al. | 351/162 |
| 5,805,260 A * | 9/1998 | Roffman et al. | 351/161 |
| 5,905,561 A | 5/1999 | Lee et al. | 623/6.31 |
| 5,980,040 A | 11/1999 | Xu et al. | 351/162 |
| 6,544,286 B1 | 4/2003 | Perez | |
| 6,554,424 B1 | 4/2003 | Miller et al. | 351/160 R |

FOREIGN PATENT DOCUMENTS

| | | |
|---|---|---|
| FR | 2074870 | 10/1971 |
| WO | WO 95/08135 | 3/1995 |
| WO | WO 99/00694 | 1/1999 |

OTHER PUBLICATIONS

European Search Report, dated Mar. 29, 2005, for European Application No. EP 0425 7891.

* cited by examiner

*Primary Examiner*—Jordan M. Schwartz
(74) *Attorney, Agent, or Firm*—Lois Gianneschi

(57) ABSTRACT

The invention provides a multifocal lens that incorporates a substantially opaque ring. The lens design minimizes or eliminates ghosting of images. Additionally, the lens' performance on eye is more predictable than other progressive multifocal designs.

15 Claims, 3 Drawing Sheets

MULTIFOCAL CONTACT LENSES HAVING A PINHOLE

FIELD OF THE INVENTION

The invention relates to ophthalmic lenses. In particular, the invention provides lenses that use more than one optical power, or focal length, and are useful in the correction of presbyopia.

BACKGROUND OF THE INVENTION

As an individual ages, the eye is less able to accommodate, or bend the natural lens, to focus on objects that are relatively near to the observer. This condition is known as presbyopia. Additionally, for persons who have had their natural lens removed and an intraocular lens inserted as a replacement, the ability to accommodate is totally absent.

Among the methods used to correct for the eye's inability to accommodate is the mono-vision system in which a person is fitted with one contact lens for distance vision and one lens for near vision. The mono-vision system permits the lens wearer to distinguish both distance and near objects, but is disadvantageous in that a substantial loss in depth perception results. In another type of multifocal contact lenses, the optic zone of each lens of a lens pair is provided with more than one power. For example, the optic zone may have both distance and near power, which the eye uses simultaneously. Neither of these methods provides good results in terms of visual acuity and lens wearer satisfaction.

Lenses in which the power progressively and continuously changes from near to distance or distance to near vision power have been proposed. These lenses are advantageous in that they distribute light from viewed distant to near objects in a smooth fashion. However, when these lenses move on the eye so that the lens is not aligned with the center of the lens wearer's line of sight, visual artifacts, or ghosting of the image, results. By "ghosting" is meant that the object being viewed through the lens along with a faint image of the object is seen by the lens wearer. Thus, a need exists for a progressive design in which this disadvantage is overcome.

DETAILED DESCRIPTION OF THE INVENTION AND PREFERRED EMBODIMENTS

Figure 1:
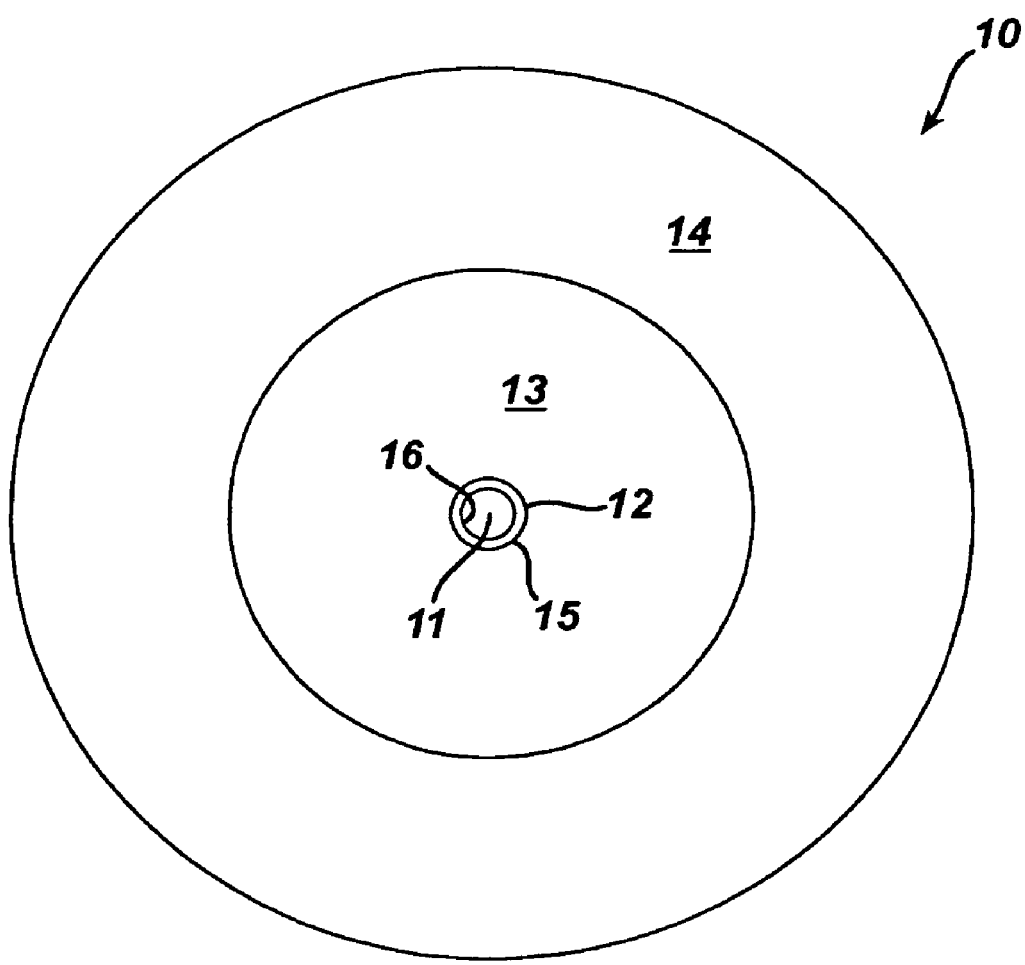
FIG. 1 is a plan view of a surface of a lens of the invention.

The invention provides methods for designing lenses useful for correcting presbyopia, lenses incorporating such designs, and methods for producing these lenses. The lenses are advantageous in that a progressive design is utilized in which ghosting of images is minimized or eliminated. Additionally, the lens' performance on eye is more predictable than other progressive multifocal designs.

In one embodiment, the invention provides a contact lens comprising, consisting essentially of, and consisting of an optic zone having a progressive power zone comprising, consisting essentially of, and consisting of a distance vision power region, a near vision power region and a transition region therebetween, wherein a substantially opaque annular ring obscures light transmission through the transition region.

By "progressive power zone" means a continuous, aspheric zone having a distance vision power region and a near vision power region, and a transition region of increasing or decreasing dioptric power connecting the distance and near regions. By "distance vision power region" is meant a region having an amount of refractive power required to correct the lens wearer's distance vision acuity to the desired degree. By "near vision power region" is meant a region having an amount of refractive power required to correct the wearer's near vision acuity to the desired degree.

In the lenses of the invention, a substantially opaque annular ring overlies the transition region. By "substantially opaque" is meant that the opacity of the annular ring is about 75 to about 100%, meaning that 75 to 100% of incident light is absorbed. The amount of opacity used for the ring will depend upon a balancing of the desired visual result from use of the ring with the loss of light that results from increasing opacity. In the lenses of the invention, a range of opacity of about 75 to about 95% is preferred. The dimension of the ring is such that it substantially corresponds to, or is slightly larger than, the dimensions of the transition region. Typically, the transition region will be about 0.7 to about 1.2 mm in diameter and, thus, the ring will be about 0.7 to about 1.2 mm, preferably 0.95 to about 1.15 mm in diameter. The diameter of the annular ring is such that, in no instance is the ring greater than the lens wearer's pupil regardless of lighting conditions.

The opacity of the ring may itself be progressive meaning that the opacity increase as one moves from the periphery of the ring towards its innermost edge. The opaque ring may be provided by coating or printing the ring onto a surface of the lens by any convenient method. Suitable tints and pigments useful in coating or printing the ring are well known in the art. Alternatively, the opaque ring may be deposited onto the desired portion of the molding surface of a lens mold. By "molding surface" is meant the surface of a mold or mold half used to form a surface of a lens. Preferably, the deposition is carried out by pad printing by known methods.

As yet another alternative, the ring may be provided by incorporating a ring-shaped layer of material within the lens material. As still another alternative, the lens surface may be disrupted as, for example, by etching to provide the opaque ring.

In FIG. 1 is depicted a lens 10 of the invention. Lens 10 has a central region 11, which is a near vision power region, a transition region (not shown), annular ring 12 overlying the transition region, distance vision power region 13, and non-optical, lenticular region 14. Annular ring 12 has a periphery 15 and an innermost edge 16. Operation of the lens is demonstrated as follows.

Figure 2:
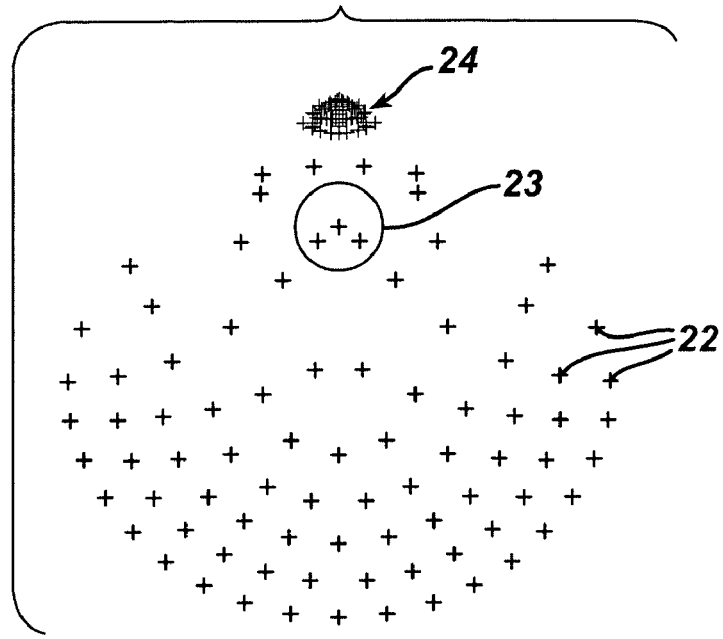
FIG. 2 is a depiction of a ray trace model of a progressive lens.

FIG. 2 shows a spot diagram produced using ZEMAX™ raytrace design software. An eye and a lens having progressive power was modeled and a pattern of rays for a 2 mm aperture pupil was traced through them. The lens diameter was 14.4 mm and the entire optic zone diameter was 8 mm. The 2 mm aperture pupil was selected to provide a high luminance, or small pupil, model. The rays are seen as crosses 22 along with pupil 23 and near image 24. The lens is decentered upwardly by approximately 1000 μm and tilted 7 degrees, meaning that the superior portion of the lens tilts toward the eye so that an angle of 7 degrees is formed between that portion of the lens and the original position, or the zero degree position when gazing straight through, of the lens on the eye. In FIG. 2, the near image is formed at the top and is surrounded by a number of crosses indicating that there is significant transition and distance region energy close to the near image, which energy will cause the lens wearer to see a ghost image.

Figure 3:
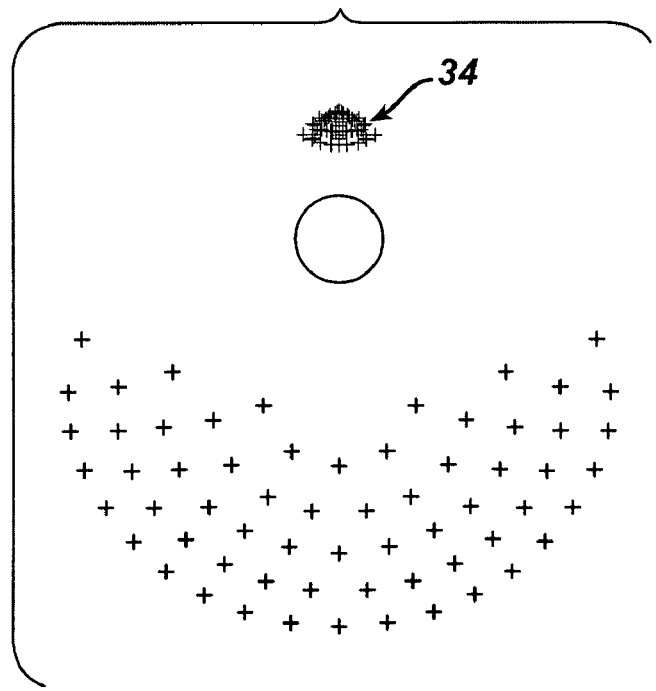
FIG. 3 is a depiction of a ray trace model of a lens of the invention.

In FIG. 3 is shown the effect of adding a ring with approximately 100% opacity, which ring overlies the transition region of the lens of Example 2. The midpoint of the transition region was about 1.0 mm from the center of the lens. The opaque ring begins at a diameter of about 0.9 mm and ends at about 1.12 mm. As shown in FIG. 3, no distance and transition region energy is close to the near image 34 indicating that the lens wearer will not see a ghosted image.

Figure 4:
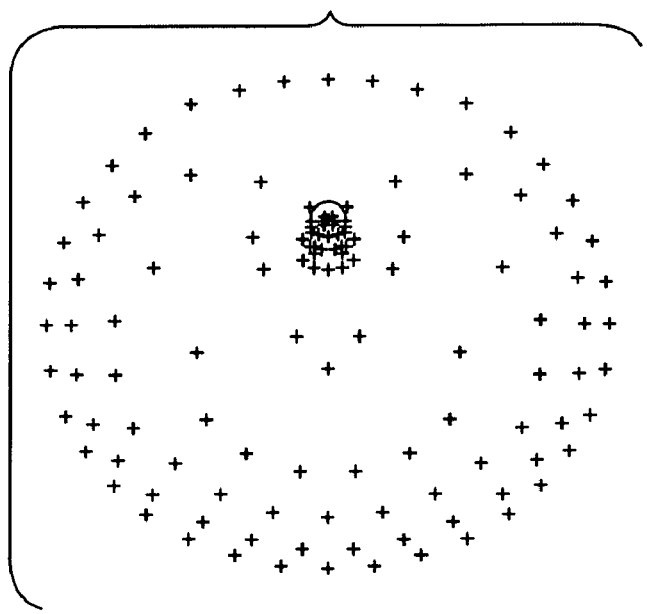
FIG. 4 is a depiction of a ray trace model of a progressive lens.

FIG. 4 shows a spot diagram for a 3.5 mm aperture pupil. The overall lens diameter was 14.4 mm with an 8 mm diameter optic zone. The lens is decentered upwardly approximately 500 μm and tilted 2.75 degrees toward the eye's surface. In FIG. 4, the near image is formed at the top and is surrounded by a number of crosses indicating that there is significant transition and distance region energy close to the near image, which energy will cause the lens wearer to see a ghost image.

Figure 5:
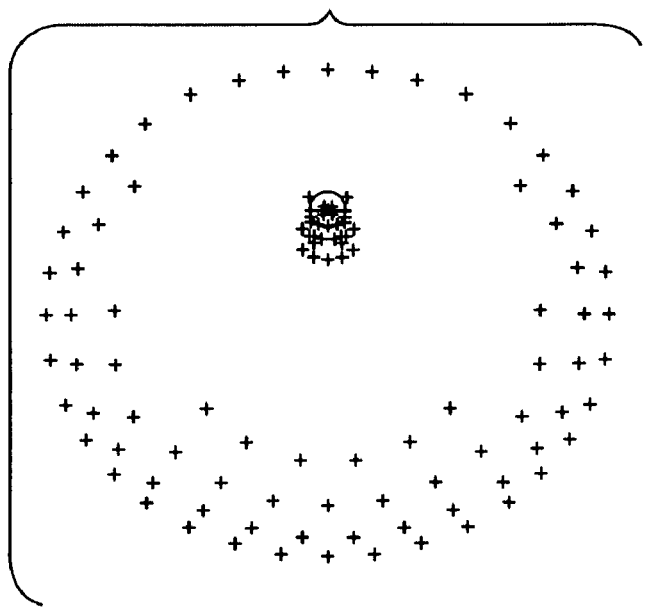
FIG. 5 is a depiction of a ray trace model of a lens of the invention.

In FIG. 5 is shown the effect of adding a ring with a approximately 100% opacity over the transition region of a lens similar to the lens of FIG. 4, except that the aperture is 3.75 mm. The change in aperture was made to determine the effect of the system in conditions of dim light in which the pupil enlarges. The midpoint of the transition region was about 1.0 mm from the lens' center and the opaque ring begins at about 0.9 mm and ends at about 1.12 mm. As shown in FIG. 3, no distance and transition region energy is close to the near image 54 indicating that the lens wearer will not see a ghosted image.

The design of the progressive power zone of the lens of the invention may be provided by utilizing any convenient design. In a preferred design, a speed and a contour for the zone is determined by the following equation:

$$Add_{(x)} = Add_{peak} * (1/(a*(1+(x/x_c)^{2n})))  \quad (I)$$

wherein:
Add$_{(x)}$ is actual instantaneous add power at any point x on a surface of the lens;
x is a point on the lens surface at a distance x from the center;
a is a constant and preferably is 1;
Add$_{peak}$ is the full peak dioptric add power, or add power required for near vision correction;
x$_c$ is the cutoff semi-diameter or the midpoint in the power transition from distance to near power, or near to distance power;
n is a variable between 1 and 40, preferably between 1 and 20; and
Add is a value that is equal to the difference in power between the near vision power and distance vision power of the lens.

In Equation I, n is the variable that controls the slope of the progression from near to distance vision power and distance to near vision power in the lens. The less the value of n, the more gradual the progression will be.

In a second preferred a speed and a contour for the progressive zone is determined by the following equation:

$$Add_{(x)} = Add_{peak} * (1/(a*(1+(x/x_c)^2)*n))  \quad (II)$$

wherein:
Add$_{(x)}$ is actual instantaneous add power at any point x on a surface of the lens;
x is a point on the lens surface at a distance x from the center;
a is a constant and preferably is 1;
Add$_{peak}$ is the full peak dioptric add power;
x$_c$ is the cutoff semi-diameter;
n is a variable between 1 and 40, preferably between 1 and 20; and
Add is a value that is equal to the difference in power between the near vision power and distance vision power of the lens.

In a third embodiment, speed and a contour for the progressive zone is determined by the following equation:

$$Add_{(x)} = Add_{peak} * (1/(a*(1+(x/x_c)^d)*n))  \quad (III)$$

wherein:
Add$_{(x)}$ is actual instantaneous add power at any point x on a surface of the lens;
x is a point on the lens surface at a distance x from the center;
a is a constant and preferably is 1;
d is an arbitrary value between 1 and 40;
Add$_{peak}$ is the full peak dioptric add power;
x$_c$ is the cutoff semi-diameter;
n is between 1 and 40, preferably between 1 and 20; and
Add is a value that is equal to the difference in power between the near vision power and distance vision power of the lens.

For purposes of this embodiment by "speed" or "contour" is meant the slope of the power change from near to distance power.

In another embodiment of a design for the progressive zone, a position, an amplitude, and a width for the progressive power zone is determined by the following equation:

$$Y = \left[\left[\frac{8a^3}{4a^2 + P(x+k)^2}\right]^S\right] * Add  \quad (IV)$$

wherein:
Y is the Add power at any point x on a surface;
x is a point on the lens surface;
a is 0.5;
k is the point within the power zone at which the power peaks;
P is the coefficient that controls the width of the power zone and is greater than about 0 and less than about 15;
S is the coefficient that controls the amplitude and its decrease in the periphery of the zone and is greater than about 0 and less than about 30; and
Add is a value that is equal to or less than the difference in power between the near vision power and distance vision power of the lens.

By "position" is meant the power zone position in reference to the pupil. By "amplitude" is meant the extent or range of the power progression within the power zone.

In another method for designing the progressive zone, the rate of change and contour of the power change from distance to near and near to distance vision power is varied. In this embodiment, the progressive zone is such that a rate of change and a contour of a power change between the distance near vision powers is determined according to an equation selected from the group consisting of:

$$\text{Power} = A - ((1-P)^x) * A \quad \text{(V)}$$

and $$\text{Power} = ((1-P)^x) * A \quad \text{(VI)}$$

wherein:
A is the Add power;
P is the pupil fraction from 0 to 1; and
X is greater than 0, preferably greater than 1, and more preferably 2, π, or 2π.

For purposes of Equation V and VI, P is determined as follows. The maximum and minimum pupil diameters are selected along with interval steps from the minimum to the maximum. The interval steps selected are at the designers discretion, but preferably are suitable to facilitate production of the lens as, for example, by computer numerical controlled lathe. From the maximum diameter, the percentage of total diameter P is defined.

Equation V is used for center distance lens designs meaning that the distance vision power is in the center of the optic zone and the near vision power is at the optic zone's periphery. Equation VI is used for center near lens designs, or lenses in which the near vision power is in the center and the distance vision is at the periphery.

Alternatively, the progressive zone may be designed so that the rate of change and contour of the power change from distance to near and near to distance vision power is varied using one of the following equations:

$$\text{Power} = A - |\sin(t)^x| * A \quad \text{(VII)}$$

and $$\text{Power} = |\sin(t)^x| * A \quad \text{(VIII)}$$

wherein:
A is the Add power;
t is the pupil fraction from 90 to 180 degrees; and
X is greater than 0, preferably greater than 1, and more preferably 2, π, or 2π.

For purposes of Equation VII and VIII, t is determined by selection of the maximum and minimum pupil diameters. The minimum diameter is assigned a value of 90 degrees and the maximum diameter of 180 degrees, in linear intervals.

Equation VII is used for center distance designs and Equation VIII is used for center near lenses. Thus, as yet another design for the progressive zone a rate of change and a contour of a power change between the distance near vision powers is determined according to and equation selected from the group consisting of:

$$\text{Power} = A - |\sin(t)^x| * A \quad \text{(IX)}$$

and $$\text{Power} = |\sin(t)^x| * A \quad \text{(X)}$$

wherein:
A is the Add power;
t is the pupil fraction from 90 to 180 degrees; and
X is greater than 0, preferably greater than 1, and more preferably 2, π, or 2π.

The designs of the invention are useful in producing contact lenses that are hard or soft lenses. Soft contact lenses, made of any material suitable for producing such lenses, preferably are used. The lenses of the invention may have any of a variety of corrective optical characteristics incorporated onto the surfaces in addition to distance and near optical powers, such as, for example, cylinder power.

In the lenses of the invention, the progressive power zone may be on the object-side, or front, surface, the eye-side, or back, surface, or both surfaces. The progressive power zone has at least two regions of differing power, distance and near vision power, and preferably three regions, distance, near, and intermediate vision power. Intermediate power may be supplied as a consequence of the power progression between the peak of the power of the near and distance vision regions. Alternatively, a region of intermediate power may also be designed, as for example by using Equation I.

The progressive power zone is preferably rotationally symmetric. In the lenses of the invention, the distance, near, and intermediate powers are spherical or toric powers. Additionally, the distance, near, and intermediate optical power regions may be of any desired and practical dimensions.

The lenses of the invention may be formed by any conventional method. For example, the progressive power zones formed therein may produced by diamond-turning using differing radii. The zones may be diamond-turned into the molds that are used to form the lens of the invention. Subsequently, a suitable liquid resin is placed between the molds followed by compression and curing of the resin to form the lenses of the invention. Alternatively, the zones may be diamond-turned into lens buttons.

What is claimed is:

1. A contact lens comprising an optic zone having a progressive power zone comprising a distance vision power region, a near vision power region and a transition region therebetween, wherein a substantially opaque ring obscures light transmission through the transition region and, wherein the opaque ring comprises an opacity of about 75 to about 95 percent.

2. The lens of claim 1, wherein the opaque ring comprises a diameter of about 0.7 to about 1.2 mm.

3. The lens of claim 1, wherein the opaque ring increases in opacity from a periphery of the ring to an innermost edge of the ring.

4. The lens of claim 1, wherein the optic zone is located on one of the front or back surfaces of the lens.

5. The lens of claim 1, wherein the progressive power zone further comprises an intermediate vision power region.

6. The lens of claim 5, wherein the distance, near and intermediate power regions comprise spherical powers.

7. The lens of claim 5, wherein the distance, near and intermediate power regions comprise toric powers.

8. The lens of claim 1, wherein the distance and near power regions comprise spherical powers.

9. The lens of claim 1, wherein the distance and near power regions comprises toric powers.

10. A method of designing a contact lens comprising the steps of:
providing an optic zone having a progressive power zone comprising a distance vision power region, a near vision power region and a transition region therebetween; and
providing a substantially opaque ring in the transition region that obscures light transmission through the transition region, wherein the opaque ring comprises an opacity of about 75 to about 95 percent.

11. A method of manufacturing a contact lens comprising the steps of:

providing an optic zone having a progressive power zone comprising a distance vision power region, a near vision power region and a transition region therebetween; and providing a substantially opaque ring in the transition region that obscures light transmission through the transition region, wherein the opaque ring comprises an opacity of about 75 to about 95 percent.

12. The method of claim 11, wherein the opaque ring is provided by coating or printing the ring onto a surface of the lens.

13. The method of claim 11, wherein the opaque ring is provided by depositing the ring onto a desired portion of a molding surface of a lens mold.

14. The method of claim 11, wherein the opaque ring is provided by incorporating a ring-shaped layer of material within a lens material.

15. The method of claim 11, wherein the opaque ring is provided by etching a surface of a lens.

* * * * *